US011352925B2

(12) United States Patent
Sommier et al.

(10) Patent No.: US 11,352,925 B2
(45) Date of Patent: Jun. 7, 2022

(54) HEATING ELEMENT FOR AN EXHAUST GAS PURIFICATION DEVICE

(71) Applicant: FAURECIA SYSTEMES D'ECHAPPEMENT, Nanterre (FR)

(72) Inventors: Thomas Sommier, Belfort (FR); Matthieu Riverain, Bavans (FR); Marc Leroux, Colombier Fontaine (FR); Sébastien Hanauer, Le Haut Soultzbach (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/215,029

(22) Filed: Mar. 29, 2021

(65) Prior Publication Data
US 2021/0301701 A1    Sep. 30, 2021

(30) Foreign Application Priority Data

Mar. 31, 2020    (FR) .................................... 20 03164

(51) Int. Cl.
*F01N 13/18*    (2010.01)
*F01N 3/20*    (2006.01)

(52) U.S. Cl.
CPC ........ *F01N 3/2013* (2013.01); *F01N 13/1844* (2013.01); *F01N 2240/16* (2013.01); *F01N 2450/20* (2013.01)

(58) Field of Classification Search
CPC .... F01N 3/027; F01N 3/2013; F01N 2240/16; H05B 2203/022
See application file for complete search history.

(56) References Cited

U.S. PATENT DOCUMENTS

| 2006/0177358 | A1* | 8/2006 | Lee ..................... B01D 53/9454 422/174 |
| 2018/0291786 | A1 | 10/2018 | Bartolo |
| 2018/0291787 | A1* | 10/2018 | Bartolo ................... H05B 3/03 |
| 2019/0234266 | A1 | 8/2019 | Bartolo |
| 2019/0316507 | A1 | 10/2019 | Ottaviani et al. |
| 2021/0156289 | A1* | 5/2021 | Kurpejovic ........... F01N 3/2013 |

FOREIGN PATENT DOCUMENTS

| CN | 106089372 B | 11/2018 |
| EP | 2947288 A1 | 11/2015 |
| WO | 2005093232 A1 | 10/2005 |

OTHER PUBLICATIONS

Preliminary Research Report for French Application No. 2003164 dated Aug. 27, 2020.

* cited by examiner

*Primary Examiner* — Jonathan R Matthias
(74) *Attorney, Agent, or Firm* — Carlson, Gaskey & Olds, P.C.

(57) ABSTRACT

A heating element for a vehicle exhaust gas purification device is provided and is to be disposed in an exhaust gas duct. The heating element extends around a central axis. and comprises a central support defined around the central axis, a heating grid extending radially around the central support, and a liaison element. The liaison element comprises a plurality of mounting brackets comprising at least a first part connecting the mounting brackets to the heating grid, at least a second part connecting the bracket to the duct, intended to be directly or indirectly attached to the duct, and at least one intermediate section connecting the first connecting part to the second connecting part. The connecting element is at least partially radially flexible.

20 Claims, 7 Drawing Sheets

HEATING ELEMENT FOR AN EXHAUST GAS PURIFICATION DEVICE

CROSS-REFERENCE TO RELATED APPLICATIONS

This application is a U.S. non-provisional application claiming the benefit of French Application No. 20 03164, filed on Mar. 31, 2020, which is incorporated herein by reference in its entirety.

TECHNICAL FIELD

The present disclosure relates to a heating element for an exhaust gas purification device of a vehicle, intended to be provided in an exhaust gas circulation duct. The heating element extends around a central axis and comprises a central support defined around the central axis, a heating grid extending radially around the central support, and a connecting element. The connecting element comprises a plurality of mounting brackets comprising: at least a first part for connecting the mounting bracket to the heating grid, at least a second part connecting the bracket to the duct, intended to be directly or indirectly attached to the duct, and at least one intermediate section connecting the first connecting part to the second connecting part.

The disclosure also relates to an exhaust line comprising such a heating element and a vehicle comprising such an exhaust line.

BACKGROUND

The exhaust lines of vehicles equipped with combustion engines typically include catalytic purification elements, for example to convert NOx, CO and hydrocarbons into $N_2$, $CO_2$ and $H_2O$. Such devices are only effective when the catalytic material is at a temperature above a predefined temperature threshold.

For this purpose, purification devices have been developed that comprise a heating element mounted opposite the upstream side of a purification element, so as to accelerate the heating of the purification element when the vehicle is started. Such heating elements include a heating grid and a connecting element ensuring the mechanical connection between the heating grid and a duct in which the heating grid is housed.

However, the existing heating elements are not entirely satisfactory. Temperature variations within the purification device, and more generally the exhaust line, cause non-uniform deformations between the heating element and the duct in which it is placed. Such variations have a detrimental effect on the life of the heating element.

SUMMARY

The subject of the disclosure increases the service life of the heating elements. It should be noted that the subject of the disclosure also improves the performance of such heating elements and the simplification of the installation of such heating elements in exhaust lines.

For this purpose, the subject of the disclosure is a heating element in which the connecting element is at least partially radially flexible.

According to particular embodiments of the disclosure, the heating element also has one or more of the following characteristics, considered alone or in any technically possible combination:

- the connecting element comprises an electrically conductive peripheral frame defined around the central axis and having an inner edge and an outer edge, the plurality of mounting brackets being connected to the outer edge of the peripheral frame, the first connecting part of the mounting bracket being connected to the peripheral frame, the peripheral frame connecting the first connecting part to the heating grid;
- each mounting bracket is rigid, the perimeter frame having at least one opening making the perimeter frame radially flexible at this opening;
- each mounting bracket is radially flexible, the intermediate section of each bracket radially defining an inner opening between the second connecting part and the heating grid, the intermediate section being shaped to be elastically deformed by radially reducing or increasing the inner opening;
- the first connecting part of each mounting bracket is angularly offset about the central axis with respect to the second connecting part of this mounting bracket;
- the heating grid is formed of strands connected by nodes, the heating grid comprising an inner ring, each of the nodes of the inner ring being angularly offset with respect to each of the nodes radially adjacent thereto to form inner lines, preferably each in the shape of a curve, including each in the shape of a constant sign concave curve, for example forming at least one part of a spiral;
- the heating grid comprises an outer ring surrounding the inner ring and separated from the inner ring by elongated nodes of radial elongation greater than the radial elongation of the nodes of the inner ring adjacent to the elongated nodes;
- each of the nodes of the outer ring is angularly offset with respect to each of the nodes radially adjacent to it to form outer lines, preferably each in the shape of a curve, including each in the shape of a constant sign concave curve, for example forming at least one part of a spiral;
- the heating grid is connected to the mounting brackets by elongated nodes of radial elongation greater than the radial elongation of the nodes of the inner ring adjacent to the elongated nodes.

The disclosure further relates to an exhaust line comprising a duct for the circulation of exhaust gases and a heating element as described above, the second connecting part of each mounting bracket being integral with the duct.

The disclosure further concerns a vehicle comprising an exhaust line as described above.

BRIEF DESCRIPTION OF THE DRAWING

Other features and advantages of the disclosure will appear upon reading the description that follows, given only as a non-limitative example and made with reference to the appended drawings, in which.

DETAILED DESCRIPTION

In the rest of the description, the terms upstream and downstream are defined as a function of the direction of flow of a fluid from a source, an upstream point being closer to the source of the flow than a downstream point.

Figure 1:
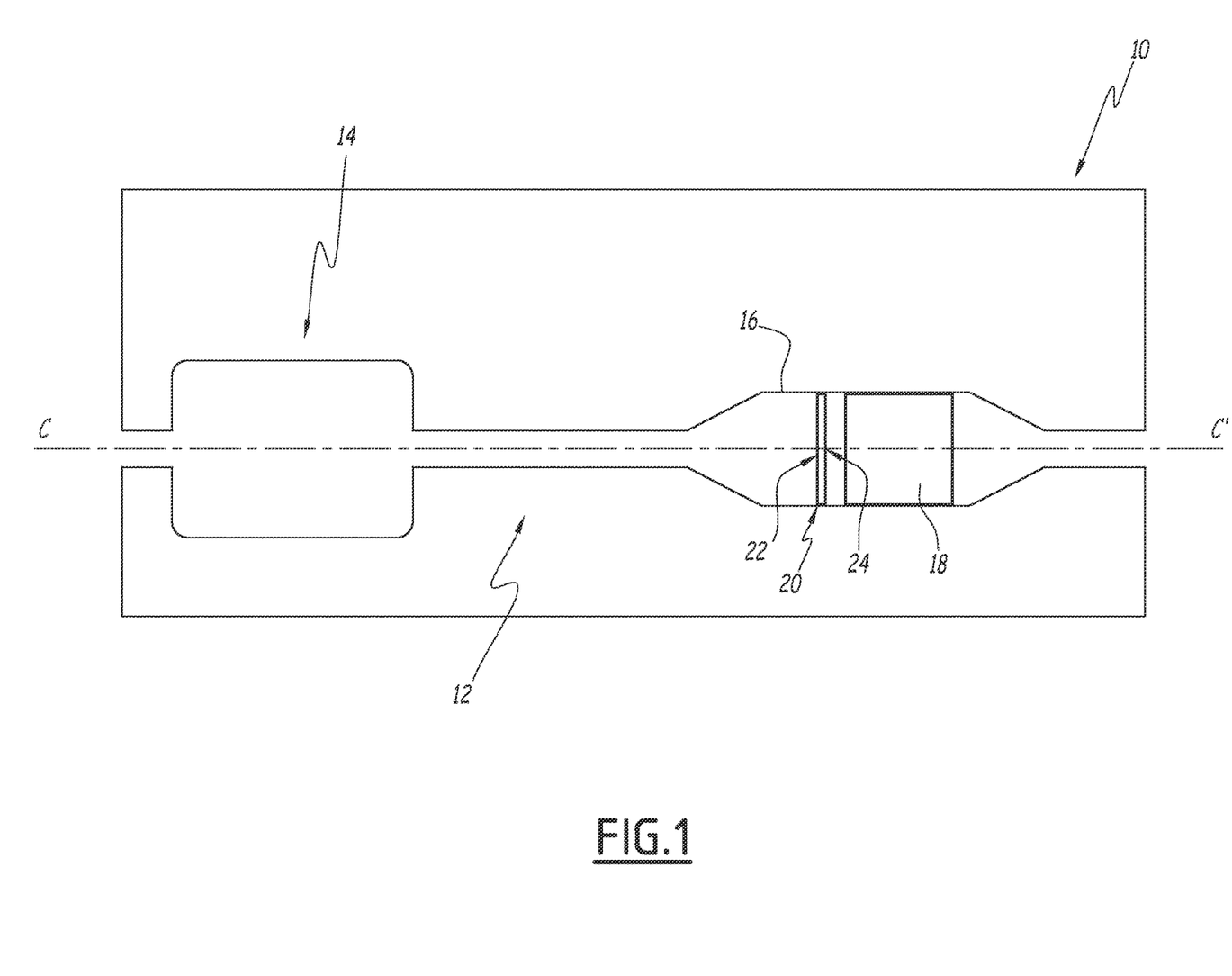
FIG. 1 is a schematic representation of a vehicle having an exhaust system including a heating element according to the disclosure.

A vehicle 10 with an exhaust line 12 is shown in FIG. 1. The vehicle 10 is typically a motor vehicle, such as a car or truck.

The exhaust line 12 includes, for example, as shown in FIG. 1, an inner combustion engine 14, as well as an exhaust gas circulation duct 16, fluidly connecting the inner combustion engine 14 to an exterior of the vehicle 10. The exhaust line 12 further comprises an exhaust gas purification unit 18 and a heating device 19 comprising an exhaust gas heating element 20.

The heating element 20 and the purifier 18 are located in the same exhaust gas purifier, for example. In particular, the heating element 20 is arranged opposite the cleaning element 18. For example, the heating element 20 extends upstream or downstream of one side of purifier 18, for example, at a short distance from the purifier, in particular at a distance of less than 10 cm.

The heating element 20 extends around a central C-C' axis.

The heating element 20 is located in the exhaust gas circulation duct 16. The heating element 20 is designed to extend around a central axis of duct 16, the central C-C' axis then being substantially aligned with the central axis of the duct 16.

The heating element 20 is made in a single piece of material. In particular, the heating element 20 is formed entirely from a conductive material.

The conductive material is, for example, selected from Iron-Chromium-Aluminum (FeCrAl) and its alloys, Nickel-Chromium (NiCr) and its alloys, stainless steel, Inconel® or silicon carbide. For example, the material is Kanthal® A1, Nichrome® 80, Nichrome® 70, Nicrofer® or Nikrothal® 80.

Figure 2:
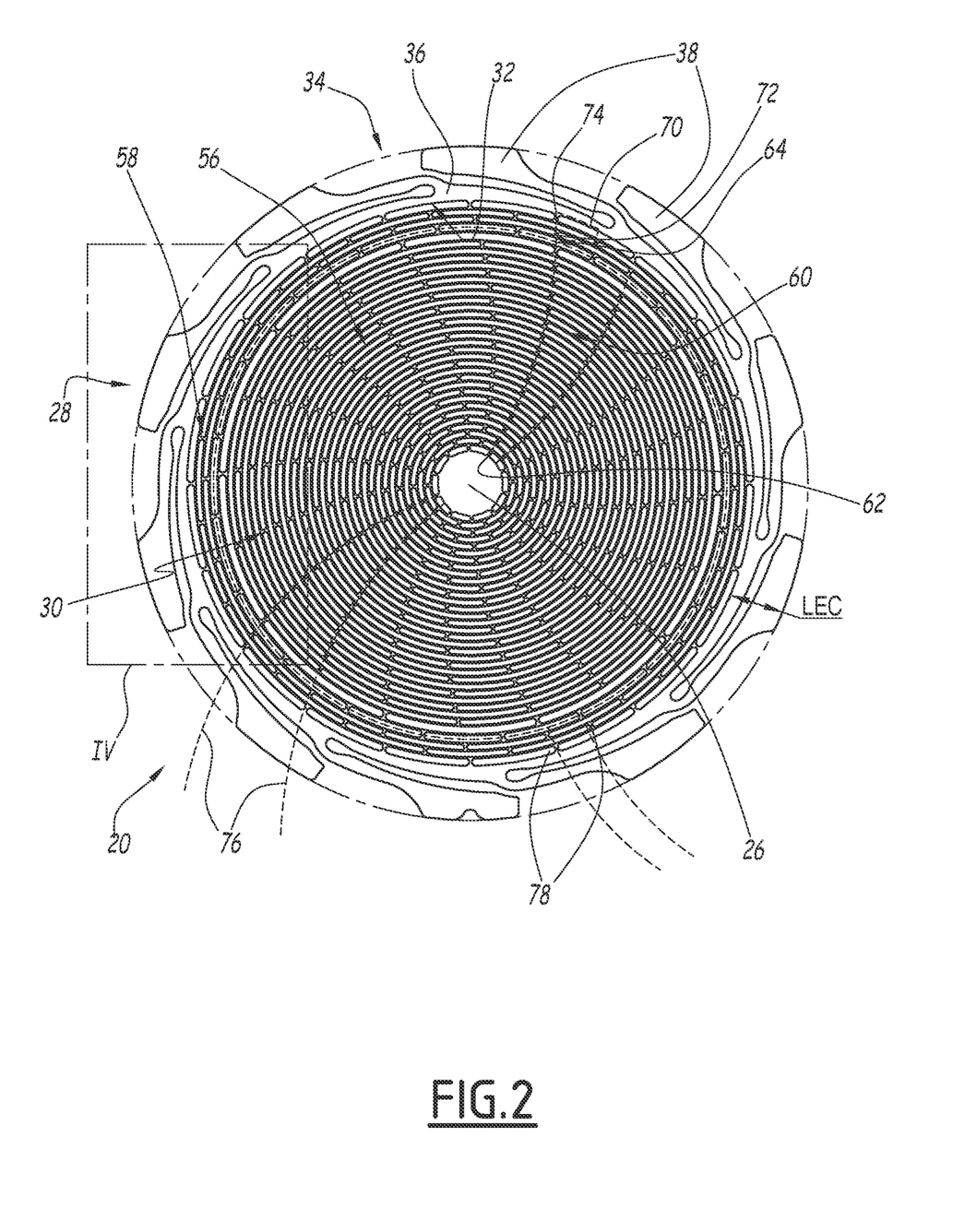
FIG. 2 is a schematic representation, taken parallel to an axis of circulation of the exhaust gases of the heating element of FIG. 1, according to a first example embodiment.

Referring to FIG. 2, the heating element 20 comprises a central support 26, a peripheral connecting element 28 and an apertured heating grid 30 extending radially between the central support 26 and the peripheral connecting element 28, substantially in a plane perpendicular to the central C-C' axis.

The central support 26 is defined around the central C-C' axis. The central support 26 is located in the center of the heating element 20. For example, the central support 26 forms a disc through which the central C-C' axis passes, or a ring defined around the central C-C' axis.

Figure 7:
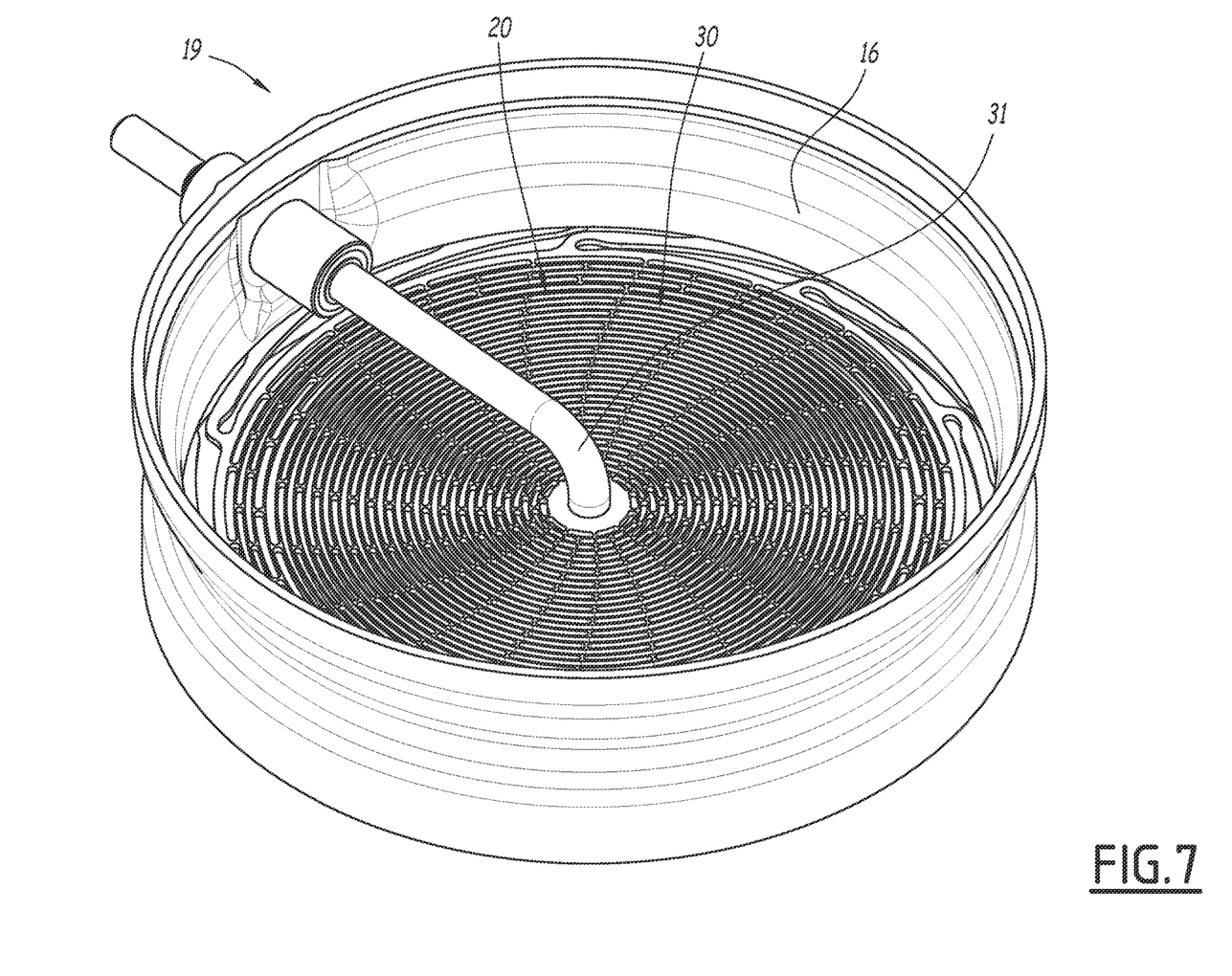
FIG. 7 is a schematic perspective view of a heating device comprising the heating element of FIGS. 1 to 4.

As shown in FIG. 7, the central support 26 is, for example, intended to receive the electrical supply from the heating element 20, such as an electrode 31. This is, for example, suitable for attachment to the central support 26.

The central support 26 is integral and connected to the heating grid 30 at its periphery. For example, the central support 26 and the heating grid 30 are of the same material.

The connecting element 28 extends around the central C-C' axis on the periphery of the heating grid 30. The connecting element 28 is designed to hold the heating element 20 in the duct 16. In one particular embodiment, the connecting element 28 is intended to mechanically and electrically connect the heating element 20 to the duct 16.

The connecting element 28 has an inner contour 32 and an outer contour 34, between which it extends radially. The inner contour 32 and the outer contour 34 together define, by their radial spacing, a LEC width of the connecting element 28.

The inner contour 32 of the connecting element 28 is connected to the heating grid 30. In the example described, the connecting element 28 and the heating grid 30 are made of the same material.

The outer contour 34 of the connecting element 28 is intended to be connected to the duct 16.

For example, the outer contour 34 of the connecting element 28 is designed for direct connection to the duct 16, as shown in FIG. 7. The outer contour 34 is then intended to be in contact with the duct 16 and to be electrically connected to the duct 16.

Alternatively (not shown), the outer contour 34 of the connecting element 28 is intended to be connected indirectly to the duct 16. "Indirectly" here means that the outer contour 34 of the connecting element 28 is connected to the duct via an intermediate element and is, for example, electrically insulated from the duct 16. The outer contour 34 is then suitable, for example, for direct connection to a connecting ring surrounded by an insulating ring, with the insulating ring connecting the connecting ring to the duct 16. The power supply then comprises at least one additional electrode (not shown) connected to the connecting ring and supplying electricity to the heating element 20 via the outer contour 34 of the connecting element 28.

According to the disclosure, the connecting element 28 is radially flexible. In other words, the LEC width of the connecting element 28 is susceptible to change by a radial force applied to this connecting element 28. "Radial force" means a force applied radially to the inner contour 32 and the outer contour 34 of the connecting element 28.

The LEC width of the connecting element 28 is subject to change when the temperature of the heating element 20 changes and when the heating element is located in the duct 16. For example, if the heating element 20 is heated to 100° C., and the heating element 20 is located in the duct 16, the LEC width may be reduced or increased by 0.1 mm.

The connecting element 28 comprises a peripheral frame 36 defined around the central C-C' axis, and a plurality of brackets 38 arranged radially around the peripheral frame 36.

The peripheral frame 36 extends in particular radially between the heating grid 30 and the plurality of brackets 38.

The perimeter frame 36 is made of electrically conductive material.

The perimeter frame 36 has an inner edge 40 and an outer edge 42, and extends radially between the inner edge 40 and the outer edge 42. The perimeter frame 36 is integral and connected to the heating grid 30 at its inner edge 40 on the one hand, and integral and connected to the plurality of brackets 38 at its outer edge 42 on the other hand.

Each mounting bracket 38 comprises at least a first connecting part 44 of said bracket 38 with the peripheral frame 36, at least a second connecting part 46 of said bracket 38 with the duct 16, and at least one intermediate section 48 connecting the first connecting part 44 to the second connecting part 46.

Figure 3:
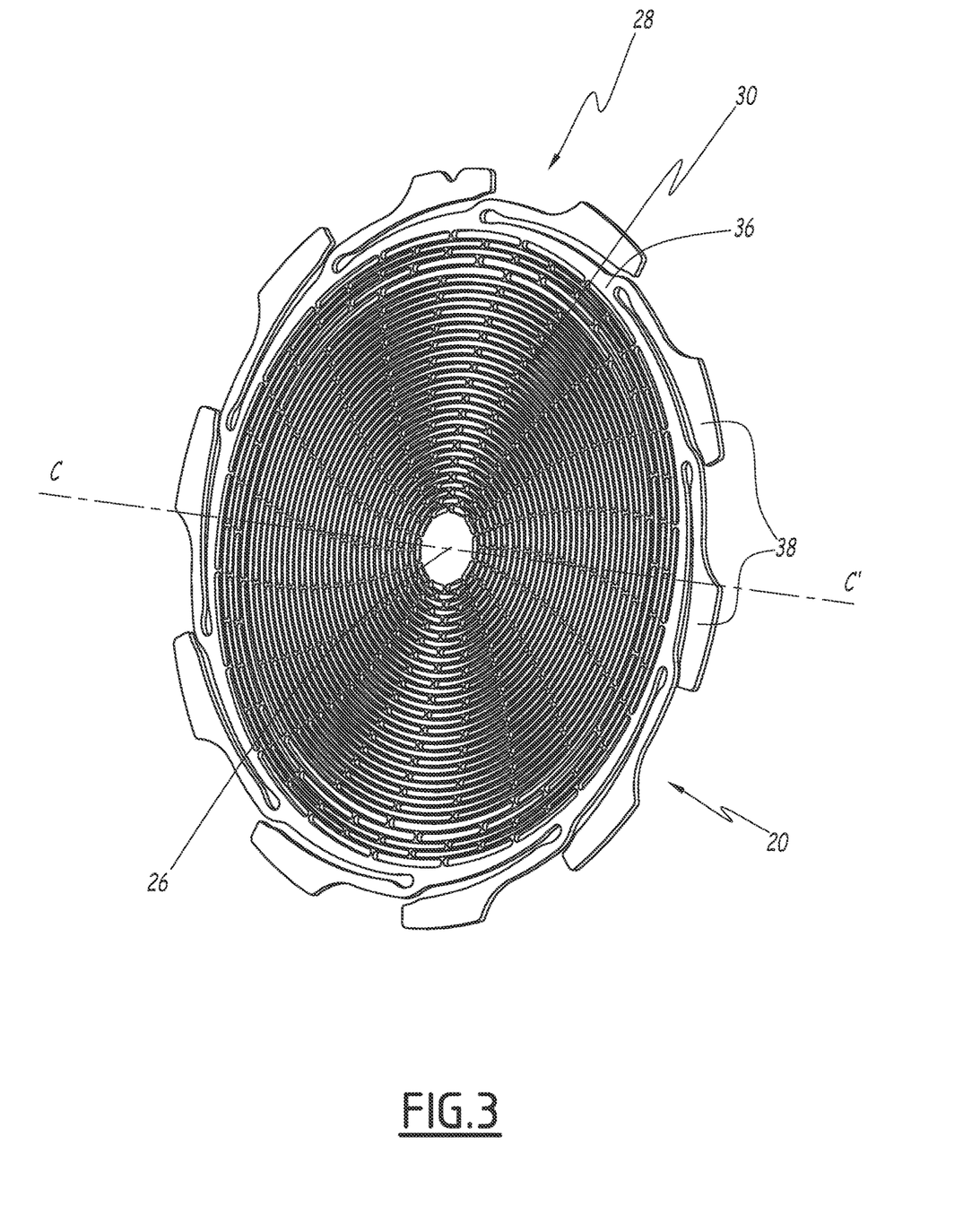
FIG. 3 is a schematic representation of the heating element of FIG. 2, seen in perspective.
Figure 4:
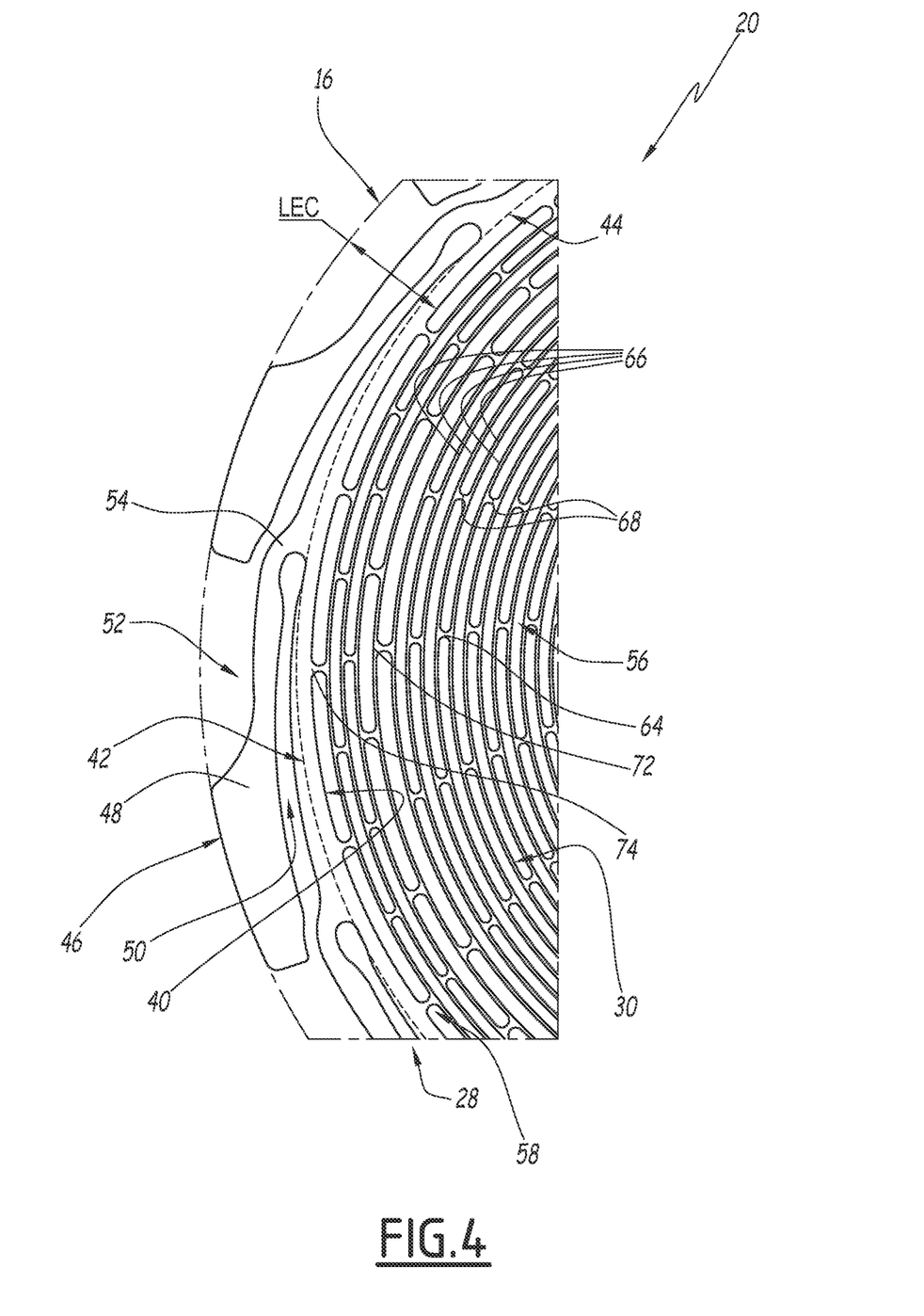
FIG. 4 is a view of detail IV of FIG. 2.

In the embodiment shown in FIGS. 2 to 4, each mounting bracket 38 extends substantially in the plane perpendicular to the C-C' axis, for example in the continuity of the heating grid 30.

According to this first embodiment, each mounting bracket 38 is flexible. For example, each mounting bracket 38 is configured to be deformed in the plane perpendicular to the C-C' axis.

The first connecting part 44 corresponds to a section of the mounting bracket 38 connecting the rest of the mounting bracket 38 to the heating grid 30, in particular through the peripheral frame 36 by being connected to the outer edge 42 of the peripheral frame 36. In the variant shown in FIGS. 2 to 4, each mounting bracket 38 has only a first connecting part 44.

The second connecting part 46 corresponds to a section of the mounting bracket 38 to connect the rest of the mounting bracket 38 to the duct 16. The second connecting part 46 is in particular intended to connect the rest of the bracket 38 to the duct 16 directly or indirectly, that is, either by being in contact with and fixed to the duct 16 and being electrically connected to the duct 16, or by one or more intermediate elements such as the insulating ring described above and being electrically insulated from the duct 16, for example. According to this first embodiment, the second connecting part 46 corresponds to the part of the mounting bracket 38 that is arranged on the outer contour 34. The second connecting part 46 is arranged radially outside the first connecting part 44.

In the first embodiment shown in FIGS. 2 to 4, each first connecting part 44 is angularly offset with respect to each second connecting part 46 about the central C-C' axis.

For example, each first connecting part 44 is offset from each second connecting part 46 by clockwise or counter-clockwise rotation. Alternatively, at least one first connecting part 44 is offset from a second connecting part 46 by a rotation opposite to the offset between another first connecting part 44 and another second connecting part 46.

The intermediate section 48 extends into a radial space formed between the first connecting part 44 and the second connecting part 46. The intermediate section 48 forms a body of the mounting bracket 38 extending between the first connecting part 44 and the second connecting part 46.

As shown in more detail in FIG. 4, an inner opening 50 is radially delimited between the intermediate section 48 and the heating grid 30, and more particularly between the intermediate section 48 and the peripheral frame 36. The inner opening 50 extends angularly between a closed end defined at the junction between the intermediate section 48 and the first connecting part 44, and an open end.

According to a particular variant, the inner opening 50 can extend angularly between two closed ends.

The inner opening 50 is elongated and extends in a pattern similar to the pattern of the outer edge 42, for example, slightly offset from the outer edge 42, for example, the inner opening 50 in the example in FIGS. 2 to 4 is offset from the outer edge 42 by the first connecting part 44 of an adjacent mounting bracket 38.

The intermediate section 48, together with the duct 16, radially delimits an external opening 52. Note that the inner opening 50 of one bracket 38 opens into the external opening 52 of the adjacent bracket 38.

The intermediate section 48 is flexible. The intermediate section 48 preferably has a constriction 54 at its junction with the first connecting part 44.

The constriction 54 is configured to provide good flexibility of the intermediate section 48. In particular, the intermediate section 48 is suitable for being elastically deformed, especially bent, around the constriction 54, especially perpendicularly to the central C-C' axis.

The intermediate section 48 is configured to be elastically deformed, in particular bent, by radially reducing or increasing the inner opening 50, that is, the intermediate section 48 is configured to be bent in the direction of the peripheral frame 36, in particular under the joint action of the thermal expansion of the heating element 20 and a reaction of the duct 16 on the second connecting part 46.

The heating grid 30 is preferably formed from a metallic material.

The thickness of the heating grid 30 is between 0.5 mm and 5 mm, preferably between 0.7 mm and 2 mm, even more preferably between 0.8 mm and 1.2 mm.

The heating grid 30 has a generally defined annular shape around the central C-C' axis. In the example described, the heating grid 30 consists of an inner ring 56 and an outer ring 58 surrounding the inner ring 56.

The heating grid 30 consists of strands 66 connected by nodes 68. The strands 66 and the nodes 68 delimit openings between them, each opening being delimited radially by two strands 66 and angularly by two nodes 68.

Each strand 66 is elongated along an arc of a circle defined around the central C-C' axis. The thickness of each strand 66 is preferably equal to the thickness of the heating grid 30. The radial impasto of each strand 66, also called strand width 66, is between 0.1 mm and 1 mm.

The thickness of each node 68 is preferably equal to the thickness of the heating grid 30. The minimum angular impasto, also called minimum width of the node 68, is between 0.2 mm and 2 mm.

The ratio between the width of the strand 66 and the minimum width of the node 68 is preferably between 1.5 and 2.5, and is preferably approximately equal to 2.

The radial elongation of each node 68 is between 0.3 mm and 3 mm, preferably between 1 mm and 1.3 mm.

Two radially adjacent openings are angularly offset so that each node 68 is angularly located at the angular center of the radially adjacent openings. The nodes 68 of the inner ring 56 of the heating grid 30 are grouped linearly along inner lines 76, with two angularly adjacent inner lines 76 together delimiting an inner angular sector 60 of the inner ring 56.

In the embodiment shown in FIGS. 2 to 7, each inner line 76 is shaped as a concavity curve of constant sign. In other words, each inner line 76 is concave in its entirety or convex in its entirety. In a variant not shown, at least one inner line 76 is shaped as an alternating sign concavity curve. The concavity of the curve formed by the inner line 76 then changes at least one inflection point of the curve.

Each node 68 of an inner line 76 is preferably angularly offset with respect to each node 68 radially adjacent to it on the same inner line 76.

The angular offset, around the C-C' axis, between two radially adjacent nodes 68 of the same inner line 76 is preferably between 0.5° and 5°.

Alternatively, the angular offset between two radially adjacent nodes 68 of the same inner line 76 increases as one moves away from the central C-C' axis. Thus, the angular offset between two radially adjacent nodes 68 of the same inner line 76 and close to the central support 26 is small and minimal, while the angular offset between two radially adjacent nodes 68 of the same inner line 76 and close to the connecting element 28 is maximal.

Each inner line 76 then defines a part of a spiral extending in the plane perpendicular to the central C-C' axis.

For example, the inner ring 56 comprises between 10 and 40 inner angular sectors 60. In the example shown in FIG. 2, the inner ring 56 comprises twenty inner angular sectors 60.

Each inner angular sector 60 extends radially from a first end 62 (electrically and otherwise connected to the central support 26) to a second end 64 (electrically and otherwise connected to the outer ring 58).

For example, the inner ring 56 is connected to the outer ring 58 by elongated nodes 69 whose radial elongation is at least 10% greater than the radial elongation of the nodes 68 of the inner ring 56 radially adjacent to the elongated nodes 69.

Thus, in the variant shown in FIGS. 2 to 4, the radial spacing between the radially outermost strand 66 of the inner ring 56 and the outer ring 58 is at least 10% greater than the radial spacing between two adjacent strands 66 of the inner ring 56.

In a variant not shown, the radial elongation of a set of nodes 68 arranged on the same radius of the inner ring 56 is at least 10% greater than the radial elongation of other nodes 68 of the inner ring 56, and in particular of the set of nodes 68 radially adjacent to said nodes 68. The radial elongation of all the nodes 68 connected to the central support 26 is for example at least 10% higher than the radial elongation of other nodes 68 of the inner ring 56, and in particular of all the nodes 68 radially adjacent to the said nodes 68 connected to the central support 26.

The outer ring 58 also consists of strands 66 and nodes 68, but has angularly more nodes 68 than the inner ring 56. In particular, considering a first circle defined around the central C-C' axis and passing through the nodes 68 of the inner ring 56, and a second circle defined around the central C-C' axis and passing through the nodes 68 of the outer ring 58, then the first circle crosses fewer nodes 68 than the second circle, for example, half as many nodes 68.

In a particular variant (not shown), the outer ring 58 is connected to the perimeter frame 36 by a number of nodes 68 less than the number of nodes 68 connecting the strands 66 adjacent to the perimeter frame 36 to the strands adjacent to said strands 66 on the opposite side of the perimeter frame 36.

The outer ring 58 has nodes 68 aligned with the outer lines 78. Two adjacent outer lines 78 delimit an outer corner sector 70.

For example, the outer ring 58 has between 15 and 80 outer angular sectors 70. In the example shown in FIG. 2, the outer ring 58 has forty outer angular sectors 70.

Each outer angular sector 70 extends radially from a first end 72 connected to the inner ring 56 and electrically connected to this inner ring 56, to a second end 74 connected to the peripheral frame 36 and electrically connected to the peripheral frame 36.

The outer ring 58 is connected at its second end 74 to the peripheral frame 36 via elongated nodes 69 preferably having a radial elongation at least 10% greater than the radial elongation of the other nodes 68 of the outer ring 58.

In a variant not shown, the radial elongation of a set of nodes 68 arranged on the same radius of the outer ring 58 is at least 10% greater than the radial elongation of other nodes 68 of the outer ring 58, and in particular of all the nodes 68 radially adjacent to said nodes 68. The radial elongation of all the nodes 68 connected to the peripheral frame 36 is, for example, at least 10% greater than the radial elongation of other nodes 68 of the outer ring 58, and in particular of all the nodes 68 radially adjacent to the said nodes 68. Each outer line 78 has a constant sign concavity curve shape. In other words, the outer line 78 is concave in its entirety or convex in its entirety.

In a variant not shown, at least one outer line 78 is shaped as an alternating sign concavity curve. The concavity of the curve formed by the outer line 78 then changes at least one inflection point of the curve.

Each node 68 of an outer line 78 is preferably angularly offset with respect to a radially adjacent node 68 of the same outer line 78.

The angular offset, around the C-C' axis, between two radially adjacent nodes 68 of the same outer line 78 is preferably between 0.5° and 3°.

Each outer line 78 then defines a part of a spiral extending in the plane perpendicular to the central C-C' axis.

Advantageously, at least one inner line 76 extends in the extension of an outer line 78. In the embodiment presented in FIGS. 2 to 4, all the inner lines 76 are each aligned with a respective one of the outer lines 78. On the other hand, every second outer line 78 is not aligned with an inner line 76.

The heating element 20 according to the disclosure, comprises a radially flexible connecting element 28, and is particularly advantageous for limiting the stresses in the heating element 20 and thus increasing its service life. In addition, the connecting element 28 facilitates the installation of the heating element 20 in the duct 20.

In addition, the flexible mounting brackets 38 ensure the robustness of the connecting element 28.

In addition, the geometry of the mounting brackets 38 is particularly simple and ensures cost-effective production of the heating element 20.

The arrangement of the nodes 68 on the inner lines 76 and outer lines 78 in the form of a constant concavity curve, especially in the form of spiral parts, is particularly advantageous for stiffening and increasing the eigen modes of the heating grid 30, and thus improving the service life of the heating grid 30, without affecting the efficiency of the heating element 20.

The increased radial elongation of some nodes 68 limits the risk of short circuits in the regions of discontinuity of the heating element 20.

Figure 5:
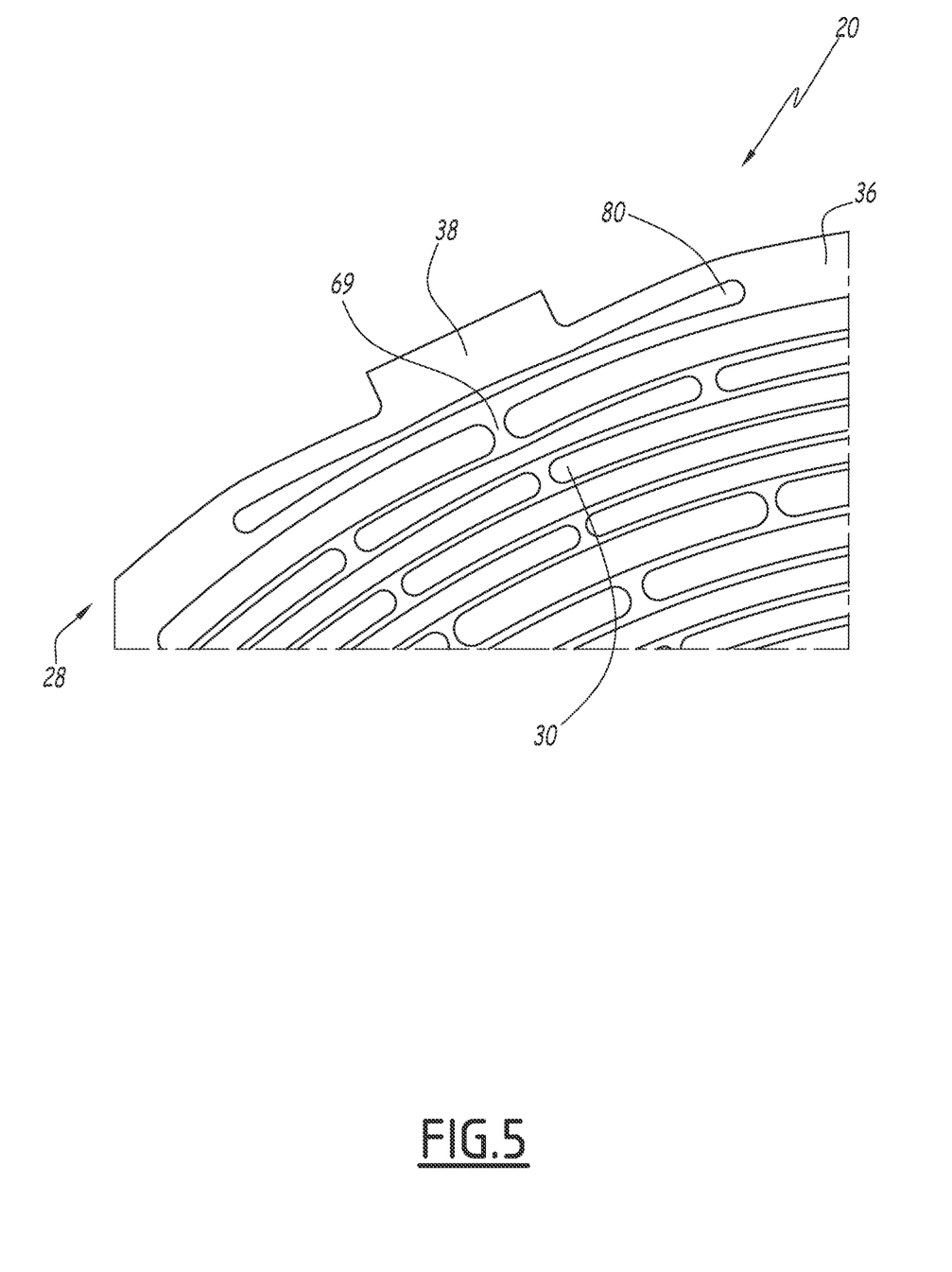
FIG. 5 is a schematic representation, taken parallel to an axis of circulation of the exhaust gases of a heating element according to a second example embodiment of the disclosure.

A second embodiment of the heating element is shown in FIG. 5. This embodiment differs only by the following; analogous elements bear the same references.

In this embodiment, the mounting brackets 38 are not flexible, but the peripheral frame 36 is flexible. In particular, the perimeter frame 36 has frame openings 80, each facing a respective one of the mounting brackets 38, and more particularly radially aligned with the first connecting part 44 of each mounting bracket 38.

The frame opening 80, for example, is elongated, for example in the shape of a circular arc, between the inner edge 40 of the perimeter frame 36 and the outer edge 42 of the perimeter frame 36.

Note that the inner opening 50 can be assimilated to a frame opening 80, such a frame opening 80 then opening on one of its sides and the frame section radially outside the opening 80 being then assimilated to a mounting bracket 38.

Figure 6:
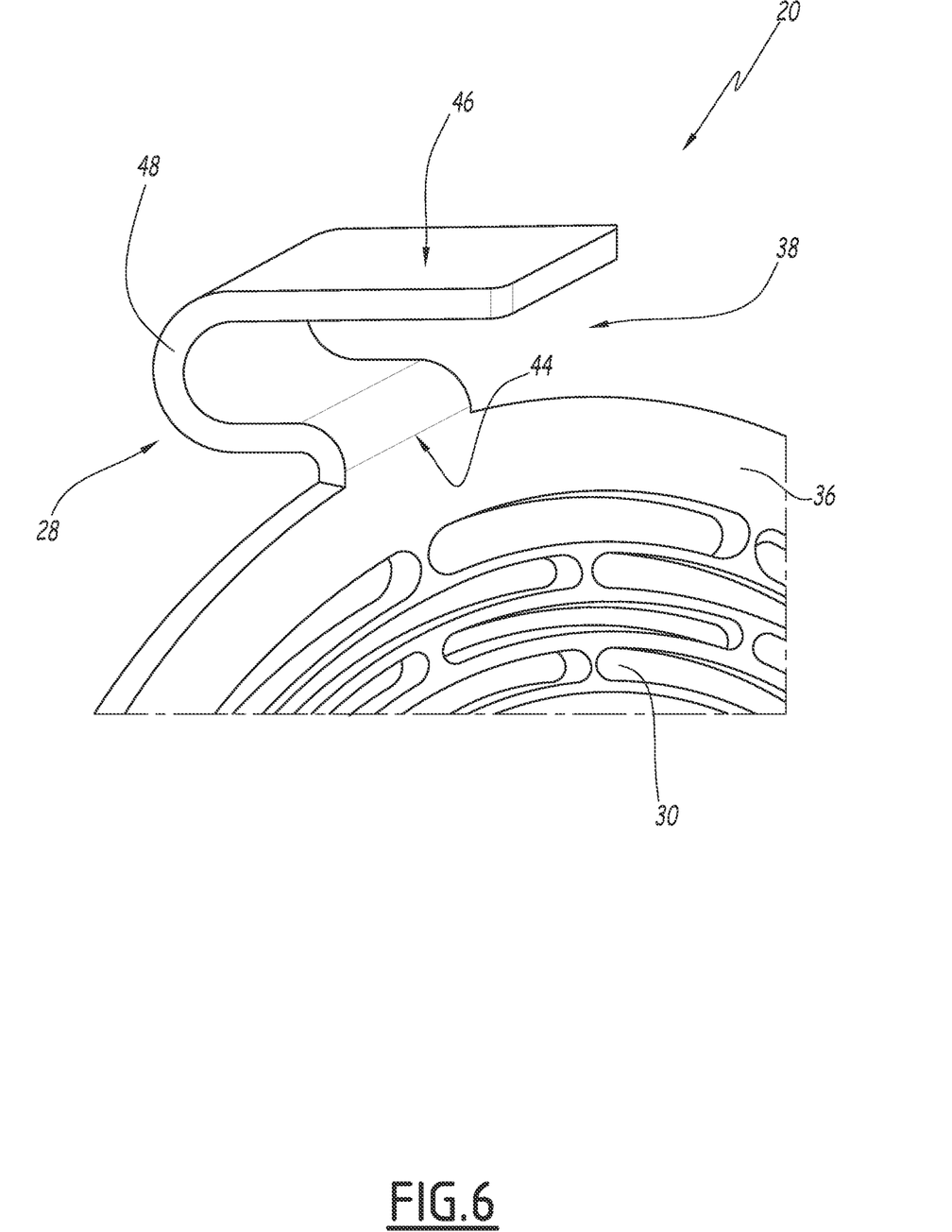
FIG. 6 is a schematic representation from a perspective view of a detail of the heating element taken according to a third example embodiment of the disclosure.

A third embodiment is presented in reference to FIG. 6. This embodiment differs only by the following, analogous elements bear the same references.

In this embodiment, the mounting bracket 38 is U-shaped, with the first connecting part 44 and the second connecting part 46 extending parallel to each other and perpendicular to the plane of the heating grid 30. The intermediate section 48 is U-shaped and extends to one side of the plane of the heating grid 30, while the second connecting part 46 extends to another side of the plane of the heating grid 30.

It should be noted that the disclosure is not limited to the embodiments described above, but could present other variants without going beyond the scope of the claims.

The invention claimed is:

1. A heating element for an exhaust gas purification device of a vehicle, to be arranged in an exhaust gas circulation duct, the heating element extending around a central axis and comprising:
 a central support defined around the central axis,
 a heating grid extending radially around the central support, and
 a connecting element comprising a plurality of mounting brackets comprising:
  at least a first part connecting the plurality of mounting brackets to the heating grid,
  at least a second part connecting the plurality of mounting brackets to the exhaust gas circulation duct, intended to be directly or indirectly attached to the exhaust gas circulation duct, and
  at least one intermediate section connecting the first connecting part to the second connecting part, and wherein the connecting element is at least partially radially flexible such that a width of the connecting element is susceptible to change by a radial force applied to the connecting element.

2. The heating element according to claim 1, wherein the connecting element comprises an electrically conductive peripheral frame defined about the central axis and having an inner edge and an outer edge, the plurality of mounting brackets being connected to the outer edge of the electrically conductive peripheral frame, the first connecting part of the plurality of mounting brackets being connected to the electrically conductive peripheral frame, the electrically conductive peripheral frame connecting the first connecting part to the heating grid.

3. The heating element according to claim 2, wherein each mounting bracket is rigid, the electrically conductive peripheral frame having at least one opening making this electrically conductive peripheral frame radially flexible at the at least one opening.

4. The heating element according to claim 1, wherein each mounting bracket is radially flexible, the at least one intermediate section of each mounting bracket radially defining an inner opening between the second connecting part and the heating grid, the at least one intermediate section being shaped to be elastically deformed by radially reducing or increasing the inner opening.

5. The heating element according to claim 1, wherein the first connecting part of each mounting bracket is angularly offset about the central axis relative to the second connecting part of a respective mounting bracket of the plurality of mounting brackets.

6. The heating element according to claim 1, wherein the heating grid is formed of strands connected by nodes, the heating grid comprising an inner ring, each of the nodes of the inner ring being angularly offset with respect to each of the nodes radially adjacent thereto to form inner lines.

7. The heating element according to claim 6, wherein each of the nodes of the inner ring is angularly offset with respect to each of the nodes radially adjacent thereto to form the inner lines, each in the form of a curve.

8. The heating element according to claim 6, wherein each of the nodes of the inner ring is angularly offset with respect to each of the nodes radially adjacent thereto to form the inner lines, each in the form of a curve of constant sign of concavity.

9. The heating element according to claim 6, wherein each of the nodes of the inner ring being angularly offset with respect to each of the nodes radially adjacent thereto to form the inner lines forming at least one spiral part.

10. The heating element according to claim 6, wherein the heating grid comprises an outer ring surrounding the inner ring and separated from the inner ring by elongated nodes of radial elongation greater than the radial elongation of the nodes of the inner ring radially adjacent to the elongated nodes.

11. The heating element according to claim 10, wherein each of the nodes of the outer ring is angularly offset with respect to each of the nodes radially adjacent thereto to form outer lines.

12. The heating element according to claim 10, wherein each of the nodes of the outer ring is angularly offset with respect to each of the nodes radially adjacent thereto to form outer lines, each in the shape of a curve.

13. The heating element according to claim 10, wherein each of the nodes of the outer ring is angularly offset with respect to each of the nodes radially adjacent thereto to form outer lines, each in the shape of a curve of constant sign of concavity.

14. The heating element according to claim 10, wherein each of the nodes of the outer ring is angularly offset with respect to each of the nodes radially adjacent thereto to form the inner lines forming at least one spiral part.

15. The heating element according to claim 6, wherein the heating grid is connected to the plurality of mounting brackets by elongated nodes of radial elongation greater than the radial elongation of the nodes of the inner ring radially adjacent to the elongated nodes.

16. An exhaust line comprising an exhaust gas circulation duct and the heating element according to claim 1, the second connecting part of each mounting bracket being integral with the exhaust gas circulation duct.

17. A vehicle comprising the exhaust line according to claim 16.

18. The heating element according to claim 1, wherein the connecting element has an inner contour and an outer contour between which the connection element extends radially, and wherein the inner contour and the outer contour together define, via radial spacing, the width of the connecting element, and wherein the inner contour of the connecting element is connected to the heating grid and the outer contour of the connecting element is intended to be directly or indirectly connected to the exhaust gas circulation duct.

19. The heating element according to claim 18, wherein the radial force comprises a force applied radially to the inner contour and/or the outer contour of the connecting element.

20. The heating element according to claim 18, wherein the width of the connecting element is subject to change when a temperature of the heating element increases.

* * * * *